United States Patent Office 2,968,531
Patented Jan. 17, 1961

2,968,531

PREPARATION OF DIBORANE

Roy M. Adams, Darlington, and Richard K. Pearson, State College, Pa., assignors to Callery Chemical Company, Pittsburgh, Pa., a corporation of Pennsylvania No Drawing. Filed Mar. 11, 1954, Ser. No. 415,690

13 Claims. (Cl. 23—204)

This invention relates to a new and improved method for the preparation of diborane and more particularly to a new and improved method for preparing diborane in substantial yield and short reaction time from alkali metal hydrides and boron halides.

The boron hydrides or boranes in general, and diborane in particular, have been very thoroughly investigated in recent years as possible sources for high energy fuels. As a result of considerable investigation, several methods have been developed for the preparation of diborane. These methods have been only moderately successful. The earliest work on the preparation of boranes, and particularly the preparation of diborane, was done by Alfred Stock and his co-workers about 1930 and earlier. Stock's method of preparing diborane was based on the hydrolysis of magnesium boride with an aqueous acid solution. This reaction yielded a mixture of several different boranes including small quantities of diborane which could be separated only by a difficult distillation process. Stock was also able to produce diborane by the decomposition of some of the higher boranes which were formed in the decomposition of magnesium boride. A few years later Schlesinger and Burg were able to obtain diborane in slightly greater yields by treating a boron halide with hydrogen in an electric arc at very low pressures. This method while slightly more effective than the method used by Stock still produced only small quantities of diborane and in rather low yields. In recent years other methods have been developed which have been more successful both in the yield of diborane and the purity of the product obtained. Some of these methods have used certain metal hydrides and boron reagents while others have used the reaction of metal borohydrides and "Lewis" acids. Lithium hydride and boron trifluoride have been found to react to produce diborane but the yields are not as high as desired and the reaction is a difficult one to control. In a similar manner sodium hydride has been used to prepare diborane both by direct and by indirect processes. The direct process for preparing diborane from sodium hydride involves the reaction of sodium hydride with a boron halide which has been found to produce diborane if the reaction is carried out in the proper proportions and under the proper reaction conditions. The indirect method for preparing diborane from sodium hydride involves the reaction of sodium hydride to form sodium borohydride which in turn is reacted with a boron halide to form diborane. This latter process is a relatively efficient process but is not as economical as desired since it involves a two-step synthesis.

It is therefore one object of this invention to provide a new and improved method for the preparation of diborane in substantial yield, high purity, and rapid reaction rate.

Another object of this invention is to provide a new and improved method for the preparation of diborane in substantial yield from an alkali metal hydride and a boron halide.

Another object of this invention is to provide an improved method for preparing diborane in which sodium hydride and boron trifluoride are reacted in suspension in a dialkyl ether of polyethylene glycol.

Other objects of the invention will become apparent from time to time throughout the specification and claims as hereinafter related.

This invention comprises a new and useful process for the preparation of diborane which will be described more fully hereinafter and the novelty of which will be particularly pointed out and distinctly claimed.

This invention is based on our discovery that under certain conditions, to be described more fully hereinafter, an alkali metal hydride and a boron halide may be reacted to produce substantially pure diborane in substantial yields and in a very short reaction time. If a quantity of an alkali metal hydride such as sodium hydride is placed in a reaction vessel and mixed with boron trifluoride for a "dry" reaction practically no reaction takes place. It has been found by other investigators that sodium hydride will react with boron trifluoride in the "dry" state if the sodium hydride is continually abraded to expose a continuously fresh reaction surface. When this reaction is carried out with such an abrasive action (such as in a ball mill or other abrasive apparatus), diborane is produced very slowly and in rather poor yield. In fact under such conditions, the reaction does not reach any substantial degree of completion after as long a time as 48 hours. Other investigators have attempted the reaction of sodium hydride and a boron halide such as boron trifluoride in a liquid reaction medium such as diethyl ether, dioxane, or the like. Reactions of this type proceed much more efficiently than a dry phase reaction and fairly substantial yields are obtainable after a rather extensive period of time. When this reaction is carried out in diethyl ether or dioxane it has been possible to obtain yields of 90% or more after about 24 to 48 hours.

We have found that if sodium hydride is placed in a reactor and mixed with a substantial excess of boron trifluoride in contact with, or in suspension in, a dialkyl ether having a formula $RO(CH_2CH_2O)_nR^1$, where $n$ is an integer equal to one or more and R and $R^1$ are alkyl radicals which may be the same, a smooth and regular evolution of diborane gas occurs almost instantaneously and the reaction reaches substantial completion in about 30 minutes.

Various experiments were carried out using the different ethers as the reaction medium for this reaction and different proportions of reactants were tested to determine their effect on the yield and rate of this reaction. Conventional glass apparatus was set up to carry out this reaction according to the chemical equation: $6NaH + 8BF_3 = B_2H_6 + 6NaBF_4$. This reaction was carried out in diethylene glycol dimethyl ether,

$$CH_3(C_2H_4O)_2OCH_3$$

in conventional glass apparatus for carrying out a low pressure reaction. The diethylene glycol dimethyl ether was first redistilled over sodium hydride to remove impurities and boron trifluoride was then added to the ether to form an etherate in the proportion of 1 mole of boron trifluoride to 1 mole of diethylene glycol dimethyl ether. Small amounts of sodium hydride were then added to the boron trifluoride-etherate and the rate of reaction was measured by the change in volume at constant pressure. The yield of diborane resulting from this reaction is expressed in terms of the ratio of actual production of diborane to theoretical production of diborane based on the sodium hydride reacted. The reaction rate is expressed in terms of the time required for the reaction to reach 80 percent completion as determined by the volume change in the system at constant pressure. Successive experimental runs were made by reacting different quantities of sodium hydride with the boron trifluoride etherate at room temperature. The data obtained from this series of reactions is presented in Table I set forth hereafter:

*Table I*

| Percent Excess of Available $BF_3$ | Percent Purity of $B_2H_6$ | Percent Yield Pure $B_2H_6$ | Time for Reaction to Reach 80% Completion, min. |
|---|---|---|---|
| 480 | 86.6 | 76 | 23 |
| 380 | 90.7 | 79 | 20 |
| 280 | 84.4 | 70 | 24 |
| 180 | 90.5 | 76 | 23 |
| 80 | 92.0 | 51 | 53 |

From the foregoing reaction data it is apparent that sodium hydride and boron trifluoride will react very rapidly in a polyethylene glycol dialkyl ether, such as diethylene glycol dimethyl ether, and will produce diborane in very substantial yields and in very short reaction time. In this tabulated data it should be particularly noted that a very high purity diborane is produced by this reaction and that the reaction reaches substantial completion in less than 30 minutes. From this tabulated data it can be seen that when the boron trifluoride is present in only a slight stoichiometric excess the yield of diborane is reduced substantially and a substantially longer reaction time is required. If an excess of boron trifluoride of more than 180 percent in excess of the stoichiometric proportions is used in this reaction the yield of diborane and the reaction time are much more desirable.

Other experiments indicate that the ethylene glycol dialkyl polyethers are generally satisfactory in carrying out this reaction and obtaining the higher yields and increased reaction rate as reported above. These polyethers have the general formula $R(C_2H_4O)_nOR^1$ as previously defined. In particular dimethoxy-ethane, diethylene glycol dimethyl ether, triethylene glycol dimethyl ether, and tetraethylene glycol dimethyl ether have been found to work satisfactorily in this reaction. Other experimental work with dialkyl ethers of polyethylene glycols such as the diethyl ethers of polyethylene glycols indicate that these polyethers will be satisfactory for carrying out this type of reaction.

In another experiment, sodium hydride was mixed with dimethoxyethane, $CH_3OCH_2CH_2OCH_3$, in a reaction flask and was stirred with a magnetic stirrer. Boron trifluoride was introduced into the reaction flask as a gas by bubbling it in under mercury. A slow stream of dry nitrogen was passed through the flask, a $-78.5°$ C. cold finger, four $-196°$ C. traps, and out through a bubbler. A 100 percent excess of boron trifluoride was added and the condensable gases were isolated and analyzed. An analysis of the reaction products indicated that in each of two different experiments under these conditions diborane was produced having a purity of 97 to 98 percent and in a yield of 81 to 82 percent.

In still another experiment, a boron trifluoride etherate was prepared which contained 1 mole of boron trifluoride per mole of tetraethylene glycol dimethyl ether, $CH_3O(CH_2CH_2O)_4CH_3$. Sodium hydride was then added to this etherate in proportions such that a 100 percent excess of boron trifluoride would remain at the completion of the reaction. The reaction was allowed to take place at a reduced pressure in a constant volume. After the reaction was completed, the condensable gases were frozen out in traps and the reaction flask was evacuated. During this evacuation operation, the liquid left in the reaction flask released a volatile gas, some of which was dissolved diborane. When the bubbling in the reaction flask ceased the condensable gases were isolated and fractionated to separate the diborane therefrom. Very little, if any, noncondensable gases were formed. In this reaction, diborane was formed having a purity of about 93 percent in a yield of 87.6 percent.

In still another experiment, a boron trifluoride etherate was prepared by allowing the tetraethylene glycol dimethyl ether to react with a predetermined quantity of boron trifluoride to produce a solution containing 1 mole of boron trifluoride per mole of ether. The temperature of the reaction was kept below 20° C. A very small quantity of sodium hydride was added to the etherate to remove any impurities that might reduce the yield of diborane. After this initial addition of sodium hydride was made, further additions of sodium hydride were made to the etherate in proportions resulting in a 100 percent excess of boron trifluoride at the end of the reaction. The reaction was allowed to take place at reduced pressure in a constant volume reactor. At the end of the reaction the reaction flask was evacuated and the condensable gases frozen out in traps. This reaction produced diborane of 98.5 percent purity and in a yield of 97.0 percent. In other experiments the boron trifluoride was added as the etherate complex. Various etherate complexes were used including the diethyl etherate as well as etherates of the polyethers. The addition of the boron trifluoride as the etherate has the advantage of ease of handling and also lengthens the useful life of the ethers used for this reaction.

From the foregoing data, it is apparent that alkali metal hydrides such as sodium hydride may be reacted with boron halides such as boron trifluoride in the presence of or in suspension in a dialkyl polyether of an ethylene glycol. Such a reaction produces diborane of a very high purity and a very substantial yield in a very short period of time. It should be noted that in carrying out this reaction in polyethylene glycol ethers the necessity for extensive agitation or the use of abrasive apparatus is completely eliminated.

While there have been several embodiments of this invention described in connection with the specification, it should be understood that within the scope of the appended claims our invention may be practiced otherwise than as specifically described.

Having thus described our invention fully and completely, what we desire to claim and secure by Letters Patent of the United States is:

1. A method of preparing diborane which comprises mixing an alkali metal hydride, MH, where M is an alkali metal, and boron halide, $BX_3$, where X is a halogen, in the presence of an ether having the formula $R(C_2H_4O)_nOR'$, where $n$ is an integer from one to four and R and R' are alkyl hydrocarbon radicals selected from the group consisting of $CH_3$ and $C_2H_5$, and collecting the diborane thus formed.

2. A method according to claim 1 in which the alkali metal hydride is present in suspension in a substantial quantity of the ether.

3. A method according to claim 1 in which the boron halide is present as a boron halide etherate in a one to one molar ratio with the ether and in which the alkali metal hydride is added in relatively small increments so that a substantial excess of boron halide is maintained at all times during the reaction.

4. A method according to claim 2 in which the alkali metal hydride is sodium hydride, NaH, and the boron halide is boron trifluoride, $BF_3$.

5. A method according to claim 2 in which the boron halide is added as a boron halide-diethyletherate, $BX_3 \cdot (C_2H_5)_2O$.

6. A method of preparing diborane which comprises mixing sodium hydride and boron trifluoride in an ether having the formula $R(C_2H_4O)_nOR'$, where $n$ is an integer from one to four and R and R' are alkyl hydrocarbon radicals selected from the group consisting of $CH_3$ and $C_2H_5$, the boron trifluoride being present in an amount more than 80 percent in excess of the stoichiometric proportion required by the equation, $$6NaH + 8BF_3 = B_2H_6 + 6NaBF_4$$

and collecting the diborane thus formed.

7. A method according to claim 6 in which the reaction is carried out at a temperature of less than 25° C.

8. A method according to claim 6 in which the boron trifluoride is present in an amount in excess of 180 percent more than that required by the equation of the reaction.

9. A method according to claim 6 in which the reaction medium is dimethoxyethane, $CH_3OC_2H_4OCH_3$.

10. A method according to claim 6 in which the reaction medium is diethylene glycol dimethyl ether, $CH_3OC_2H_4OC_2H_4OCH_3$.

11. A method according to claim 6 in which the reaction medium is triethylene glycol dimethyl ether, $CH_3O(C_2H_4O)_3CH_3$.

12. A method according to claim 6 in which the reaction medium is tetraethylene glycol dimethyl ether, $CH_3O(C_2H_4O)_4CH_3$.

13. A method according to claim 6 in which the boron trifluoride is added as a diethyletherate.

References Cited in the file of this patent

UNITED STATES PATENTS 2,544,472   Schlesinger et al. _____ Mar. 6, 1951

OTHER REFERENCES

Bulletin 502A, published by Metal Hydrides, Inc., 12–24 Congress St., Beverly, Mass. 2 pages. Received in the Patent Office February 15, 1950.